(12) United States Patent
Wang

(10) Patent No.: US 10,359,511 B2
(45) Date of Patent: Jul. 23, 2019

(54) SURVEILLANCE APPARATUS HAVING A RADAR SENSOR

(71) Applicant: Sony Corporation, Tokyo (JP)

(72) Inventor: Qi Wang, Stuttgart (DE)

(73) Assignee: Sony Corporation, Tokyo (JP)

( * ) Notice: Subject to any disclaimer, the term of this patent is extended or adjusted under 35 U.S.C. 154(b) by 732 days.

(21) Appl. No.: 14/978,542

(22) Filed: Dec. 22, 2015

(65) Prior Publication Data

US 2016/0187477 A1   Jun. 30, 2016

(30) Foreign Application Priority Data

Dec. 29, 2014   (EP) .................................... 14200460

(51) Int. Cl.

| | |
|---|---|
| *G01S 13/42* | (2006.01) |
| *H04N 7/18* | (2006.01) |
| *G08B 13/196* | (2006.01) |
| *G08B 13/16* | (2006.01) |
| *G01S 7/03* | (2006.01) |
| *G01S 13/88* | (2006.01) |

(Continued)

(52) U.S. Cl.
CPC .............. *G01S 13/42* (2013.01); *G01S 7/03* (2013.01); *G01S 13/886* (2013.01); *G08B 13/1618* (2013.01); *G08B 13/19617* (2013.01); *H04N 7/183* (2013.01); *G01S 13/867* (2013.01); *G01S 2013/0245* (2013.01)

(58) Field of Classification Search
CPC .. G01S 2013/0245; G01S 13/32; G01S 13/42; G01S 13/72; G01S 13/82; G01S 13/867; G01S 7/03; G01S 7/352; G01S 7/356; G08B 13/1961; G08B 13/22; H04N 7/183
See application file for complete search history.

(56) References Cited

U.S. PATENT DOCUMENTS 5,990,834 A    11/1999  Barrick et al.
7,495,605 B1    2/2009  Sakamoto et al.
(Continued)

OTHER PUBLICATIONS

Xuezhi Yan et al "Eigen Vector Algorithm for 3-D near-field multiple sources localization", College of Communication Engineering Jilin University Changchun, China, 7 pages.
(Continued)

*Primary Examiner* — Bernarr E Gregory
*Assistant Examiner* — Daniel P Malley, Sr.
(74) *Attorney, Agent, or Firm* — Xsensus, LLP

(57) ABSTRACT

A surveillance apparatus for determining a position of an object in a field of view, comprising a radar sensor having at least on transmitting antenna configured to transmit electromagnetic radiation and a plurality of receiving antennas configured to receive electromagnetic radiation, wherein the receiving antennas form a virtual antenna array, and a processing unit connected to the radar sensor to receive signals from the receiving antennas corresponding to the received electromagnetic radiation, wherein the processing unit is configured to determine a correlation matrix on the basis of the received signals, and wherein the processing unit is configured to determine a direction of a position of the object in the field of view with respect to the radar sensor on the basis of the correlation matrix for a defined distance of the object from the radar sensor.

12 Claims, 5 Drawing Sheets

(51) Int. Cl.
*G01S 13/86* (2006.01)
*G01S 13/02* (2006.01)

(56) References Cited

U.S. PATENT DOCUMENTS

| | | | |
|---|---|---|---|
| 7,907,083 B2 | 3/2011 | Sakamoto et al. | |
| 7,912,680 B2 | 3/2011 | Shirakawa | |
| 8,669,901 B2 | 3/2014 | Ferreol et al. | |
| 8,816,898 B2 | 8/2014 | Shirakawa | |
| 2007/0008211 A1* | 1/2007 | Yamano | G01S 13/589 342/70 |
| 2009/0040097 A1* | 2/2009 | Sakamoto | G01S 3/74 342/118 |
| 2009/0109093 A1* | 4/2009 | Sun | H04B 7/0854 342/378 |
| 2010/0085240 A1 | 4/2010 | Kai | |
| 2010/0328157 A1* | 12/2010 | Culkin | H01Q 21/061 342/372 |
| 2011/0057831 A1* | 3/2011 | Shinomiya | G01S 3/74 342/74 |
| 2011/0064171 A1* | 3/2011 | Huang | H03F 1/3247 375/346 |
| 2013/0030769 A1* | 1/2013 | Asanuma | G01S 3/74 702/189 |
| 2014/0368373 A1* | 12/2014 | Crain | G01S 5/02 342/5 |

OTHER PUBLICATIONS

"DOA estimation based on MUSIC algorithm", Kalmar Vaxio, 2014, 56 pages.
Thomas Chan et al. "Combined use of various Passive Radar Range-Doppler Techniques and Angle of arrival using MUSIC for the Detection of Ground Moving Objects", Department of Electrical Engineering, University of Washington, 16 pages.
Alexandru Dinu "Direction of Arrival estimation for MIMO FMCW Radar: EM and SAGE algorithms", Master Thesis, Munich University of Technology, 2014, 70 pages.
Ralph O. Schmidt "Multiple Emitter Location and Signal Parameter Estimation", IEEE Transactions on Antennas and Propagation, vol. AP-34, No. 3, 1986, 5 pages.

* cited by examiner

SURVEILLANCE APPARATUS HAVING A RADAR SENSOR

The present application claims priority to European Patent Application 14200460.5 filed by the European Patent Office on 29 Dec. 2014, the entire contents of which being incorporated herein by reference.

BACKGROUND

Field of the Disclosure

The present disclosure relates to the field of surveillance systems for safety and security applications. A surveillance apparatus for determining a position of an object in a field of view having a radar sensor and a corresponding surveillance method are disclosed. Application scenarios include burglar, thefts or intruder alarm as well as monitoring public and private areas, inside or outside.

Description of Related Art

Optical surveillance cameras are used in many public places like train stations, stadiums, subways etc. to prevent crimes or to identify criminals after they committed a crime. Optical surveillance cameras are widely used in the retail stores for video surveillance. Other important applications are safety-related applications including the monitoring of doors, entrance areas and exits for example emergency exits. Optical security cameras and surveying systems show good performance during regular operating conditions, however, the optical surveillance cameras are prawn to visual impairments. The images of the optical surveillance cameras can be impaired by smoke, dust, fog, fire and dirt on the camera system and the like. Furthermore a sufficient amount of ambient light or additional artificial light is necessary in order to illuminate the area to be surveyed.

An optical surveillance camera is also vulnerable to attacks of the optical system, for example paint from a spray attack, stickers glued to the optical system, card-board or paper obstruction in the field of view, or simply a photograph that pretends that the expected scene is monitored. Furthermore, the optical system can be attacked by laser pointers, by blinding the camera or by mechanical repositioning of the optical system.

Radar technology can in general overcome the drawbacks of the optical cameras, since electromagnetic waves in the millimeter-wave can penetrate most of the obstructions like smoke, dust, paint, card-board and clothes. Furthermore, radar systems can be used for precise positioning of a target, wherein a radar system can be integrated or added to an optical surveillance camera to improve the performance of the surveying system in general.

By using digital beam forming the need for conventional and physically large phased-array radar antenna systems can be omitted so that a compact size of the radar surveying system can be achieved. Since radar sensors work at lower frequencies than optical systems, a compact radar system cannot achieve a high resolution to identify targets in the field of view using conventional beam forming methods.

In the related art many methods are known for determining and estimating a target direction in a field of view of a radar sensor system using maximum likelihood estimation algorithms or MUSIC algorithms, however, the known methods for estimating a position of a target in the field of view, in particular the MUSIC algorithm have a high accuracy for objects in the far field which emit uncorrelated electromagnetic signals, however, the performance of the known algorithms degrades when the signal correlation increases and the objects are disposed close to the radar sensors.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object of the present disclosure to provide a surveillance apparatus and a corresponding surveillance method which overcome the above-mentioned drawbacks, in particular to determine a position of an object in the near field of a radar sensor with low technical effort. It is a further object to provide a corresponding computer program and a non-transitory computer-readable recording medium for implementing said method.

According to an aspect there is provided a surveillance apparatus for determining a position of an object in a field of view, comprising a radar sensor having at least one transmitting antenna configured to emit or transmit electromagnetic radiation and a plurality of receiving antennas configured to receive electromagnetic radiation, wherein the transmitting antenna and the receiving antennas form an antenna array, and a processing unit connected to the radar sensor to receive signals from the receiving antennas corresponding to the received electromagnetic radiation, wherein the processing unit is configured to determine a correlation matrix on the basis of the received signals, and wherein the processing unit is adapted to determine a direction of the object in the field of view with respect to the radar sensor on the basis of the correlation matrix for a defined distance of the object from the radar sensor.

According to a further aspect there is provided a method for estimating a position of an object in a field of view of a radar sensor comprising the steps of:

transmitting electromagnetic radiation from at least one transmitting antenna and receiving signals from a plurality of receiving antennas corresponding to received electromagnetic radiation, determine a correlation matrix on the basis of the signals received from the receiving antennas, determining a direction of the object in the field of view on the basis of the correlation matrix for a defined distance of the object from the radar sensor.

According to still further aspects a computer program comprising program means for causing a computer to carry out the steps of the method disclosed herein, when said computer program is carried out on a computer, as well as a non-transitory computer-readable recording medium that stores therein a computer program product, which, when executed by a processor, causes the method disclosed herein to be performed are provided.

Preferred embodiments are defined in the dependent claims. It shall be understood that the claimed method, the claimed computer program and the claimed computer-readable recording medium have similar and/or identical preferred embodiments as the claimed surveillance apparatus and as defined in the dependent claims.

The present disclosure is based on the idea to determine the direction of the position of the object in the field of view of the radar sensor for a defined distance of the object from the radar sensor in order to extend present algorithms to the near field detection of the radar sensor. By means of introducing the defined distance, the plane wave assumption of the far field can be replaced by the sphere wave assumption of the near field without introducing an additional parameter which would lead to a complicated algorithm and to a complicated determination of the direction of the position of the object. Hence, by introducing the defined distance to the determination of the direction of the object in the field of view, the position of the object can be determined independent of the distance from the radar sensor with low technical effort.

The surveillance apparatus in particular combines a frequency modulated continuous wave technique with the MUSIC algorithm to detect the distance and the direction of the position of the object in the field of view. The distance is preferably separately determined or estimated and used to determine the direction of the object on the basis of a correlation matrix. By this introduction of the defined distance to the known algorithm, in particular to the known MUSIC algorithm, the technical effort for calculating the direction of the position of the object can be reduced and the performance of the determination can be improved.

Further, the surveillance apparatus preferably uses beamforming techniques and the MUSIC algorithm jointly to estimate the reflectivity of the object in the field of view. An eigenvalue based model order estimation technique can be utilized to improve the estimation of the number of objects in the field of view.

Finally, the surveillance apparatus can in particular utilize correlated signals by decorrelating received signals by dividing the virtual array of antennas into different virtual sub-arrays.

The disclosed surveillance apparatus comprises a radar sensor having preferably a plurality of transmitting antennas to emit electromagnetic radiation which will be reflected by the objects in the field of view and having a plurality of receiving antennas configured to receive electromagnetic radiation, wherein the transmitting antennas and the receiving antennas form a virtual antenna array, however, the apparatus is not limited to the radar sensor system and can be combined with an optical camera system comprising one, two or more cameras and may in particular be provided as a retrofit system, which can be combined with an optical surveillance camera.

It is to be understood that both the foregoing general description of the disclosure and the following detailed description are exemplary, but are not restrictive, of the disclosure.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
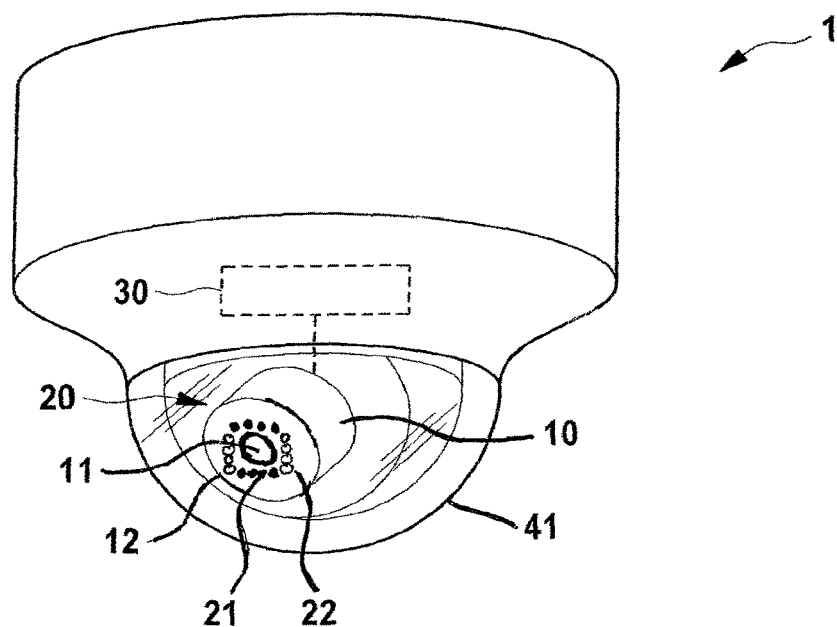
FIG. 1 shows an embodiment of a surveillance apparatus according to the present disclosure.

Referring now to the drawings, wherein like reference numerals designate identical or corresponding parts throughout the several views, FIG. 1 shows a first embodiment of a surveillance apparatus 1 according to the present disclosure. The surveillance apparatus 1 comprises an optical camera 10 configured to capture images based on received light, wherein the optical camera 10 comprises a camera aperture 11. The surveillance apparatus 1 further comprises a radar sensor 20 having one or more (here eight) transmitting antennas 21 (indicated by full circles) configured to emit electromagnetic radiation and one or more (here eight) receiving antennas 22 (indicated by empty cycles) configured to receive electromagnetic radiation. In this embodiment the antennas 21, 22 are arranged on the frame 12 of the camera 10 around the camera aperture 11. Due to their arrangement the cameras 21, 22 form a virtual antenna array. In a more general embodiment, the surveillance system 1 merely comprise the antennas 21, 22 which form a radar sensor for transmitting and receiving electromagnetic waves and for determining a position of an object in a field of view of the surveying apparatus 1.

The surveillance apparatus 1 further comprises a processing unit 30 which is connected to the antennas 21, 22 of the radar sensor to control the antennas 21, 22. The processing unit 30 is connected to the receiving antennas 22 to receive signals corresponding to the received electromagnetic radiation. The processing unit 30 is configured to estimate a distance and a direction of a position of an object in the field of view of the surveillance apparatus 1 as described in detail below.

The transmitting antennas 21 emit frequency modulated continuous wave radiation in order to determine a distance of the object in the field of view with respect to each of the receiving antenna 22 as described in detail below.

Figure 2:
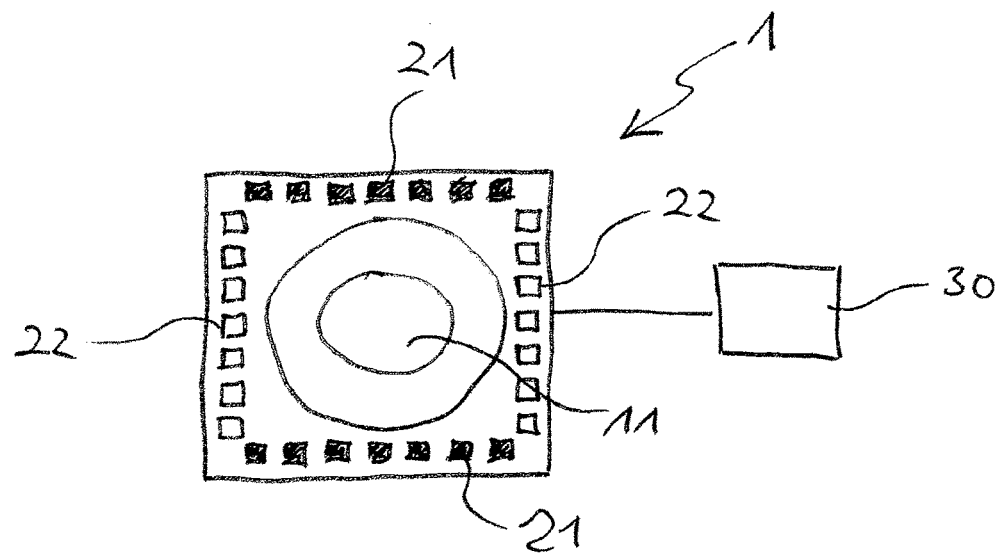
FIG. 2 shows a further embodiment of a surveillance apparatus according to the present disclosure comprising a radar sensor and an optical camera.

FIG. 2 shows a further embodiment of the surveillance apparatus 1. The surveillance apparatus 1 according to this embodiment comprises the optical camera 10 having the aperture 11 and the transmitting antennas 21 provided in two lines of seven single transmitting antenna elements 21 which are disposed on opposite sides of the aperture 11. The surveillance apparatus 1 further comprises the receiving antenna elements 22 which are formed of two rows of seven single receiving antenna elements 22, wherein the two rows are disposed on opposite sides of the optical aperture 11. The antennas 21, 22 are connected to the processing unit 30 which controls the transmitting antenna elements 21 and receives signals from the receiving antenna elements 22 corresponding to the received electromagnetic radiation. The processing unit 30 is configured to estimate a distance and a direction of the position of an object in the field of view of the antennas 21, 22, wherein the distance and the direction are determined or estimated separately on the basis of a MUSIC based algorithm performed on a correlation matrix which is determined on the basis of the single signals corresponding to the respectively received electromagnetic radiation at the receiving antenna elements 22.

The radar sensor comprises at least one transmit antenna 21 and a plurality of receive antennas 22. In the case that the radar sensor comprises merely one transmit antenna 21, the effect array will be the array of receiving antenna elements 22. In the case that the radar sensor comprises multiple transmit antenna elements 21, then the radar sensor operate with the multiple input multiple output (MIMO) principle and the effect array is a virtual antenna array formed by the transmitting antenna elements 21 and receiving antenna elements 22. In this case, the maximum size of the virtual array is a number of transmitting antenna elements 21 multiplied by the number of the receiving antenna elements 22.

The angle estimation is done with the effect array, which means for the none-MIMO case, it is the array of receiving antenna elements 22 and for the MIMO case, it is the virtual array formed by the transmitting antenna elements 21 and the receiving antenna elements 22.

Figure 3:
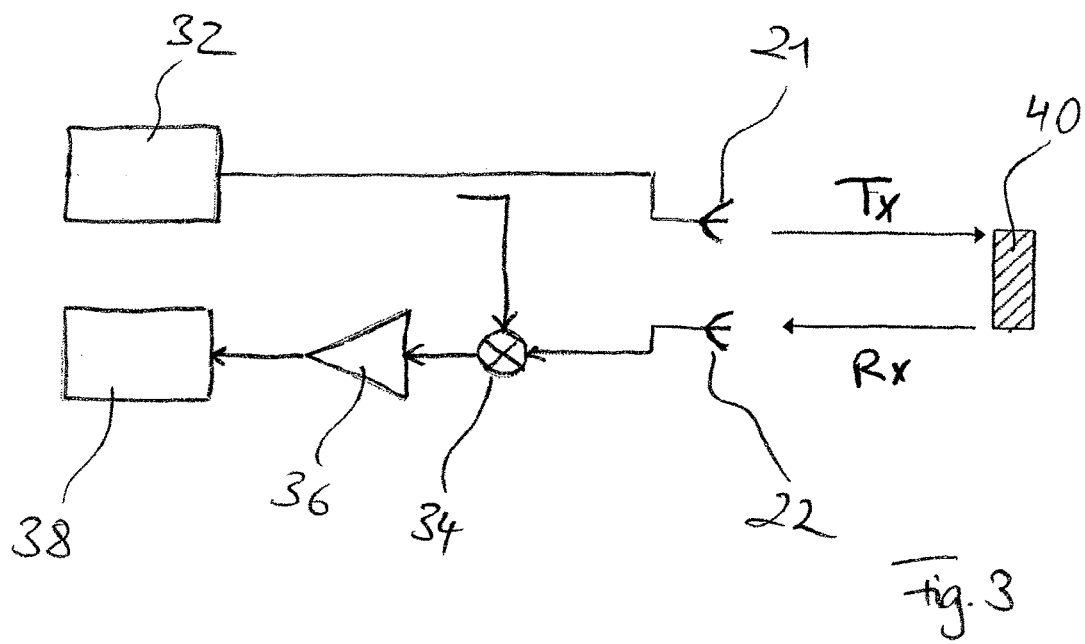
FIG. 3 shows an embodiment of a frequency modulated continuous wave radar system, FIG. 4a, b show a far field signal model and a near field signal model.

FIG. 3 shows a frequency modulated continuous wave radar system (FMCW). The radar system comprises a frequency modulator 32 which provides a continuous wave signal that is frequency modulated, wherein the frequency is changing preferably continuously over time in order to produce a chirp pulse. The frequency modulated wave signal, i.e. the chirp pulse is transmitted by the transmitting antenna 21 as a transmitted signal Tx to an object 40 in the field of view to be examined and the electromagnetic waves are reflected by the object 40 and received by the receiving antenna 22 as a received signal Rx. The received signal Rx is mixed with the transmitted frequency modulated signal Tx by means of a mixer 34. The so determined mixed signal is amplified by means of an amplifier 36 and analyzed by a spectrum analyzer 38.

Since the transmitted frequency modulated wave signal, i.e. the chirp pulse is changing the frequency over time, the frequency of the mixed signal depends on a distance between the antennas 21, 22 and the object 40. Hence, a distance between the antennas 21, 22 and the object 40 can be determined on the basis of the frequency of the mixed signal, i.e. the difference between the frequency of the transmitted frequency modulated signal Tx and the received signal Rx. The resulting frequency of the mixed signal is also known as beat frequency and directly proportional to the distance between the antennas 21, 22 and the object 40.

The beat frequency can be converted from the analogue domain to the digital domain by means of an analogue to digital converter and the complex I/Q signal from the analogue to digital converter is transformed to the frequency domain in the spectrum analyser 38 by means of a Fourier transformation to determine the respective beat frequency and to determine the distance of the antennas 21, 22 and the object 40.

The model for the frequency modulated continuous wave (FMCW) signal can be expressed by:

$$S(t) = A_C \cos\left[\omega_0 t + \frac{A_b}{2} t^2\right], 0 \le t \le T_b \quad (1)$$

wherein $T_b$ is the chirp pulse period, in which the frequency of the transmitted signal Tx is continuously increased and $\omega_0$ is the initial frequency of the transmitted signal and $A_b$ is the chirp rate. The chirp pulses are transmitted by the transmitting antenna 21 and reflected by the object 40 and the received signal Rx reflected from the object 40 can be expressed by:

$$S(t - T_P) = A_C \cos\left[\omega_0 (t - T_P) + \frac{A_b}{2} (t - T_P)^2\right] \quad (2)$$

By mixing the received signal Rx as shown in equation 2 and the transmitted signal Tx as shown in equation 1 and, further, by low pass filtering, the mixed signal $S_b$ or the beat signal $S_b$ can be obtained by:

$$S_b = \frac{A_C^2}{2}\left[\cos\left\{A_b T_P t + \left(\omega_0 T_P - \frac{A_b}{2} T_P^2\right)\right\}\right] \quad (3)$$

As shown in equation 3, the beat frequency signal $S_b$ comprises a time variant component $A_b T_p t$, which is a sine wave. The frequency of the sine wave depends on the flight time $T_p$ of the transmitted signal Tx and the received signal Rx. This flight time $T_p$ can be used to determine the distance of the object 40 from the antennas 21, 22 by determining the beat frequency $f_b$ on the basis of a Fourier transformation of the mixed signal $S_b$ and the respective spectrum analysis. The distance of the object 40 can be found by a search of the Fourier transformation peaks in the obtained spectrum.

Figure 4A:
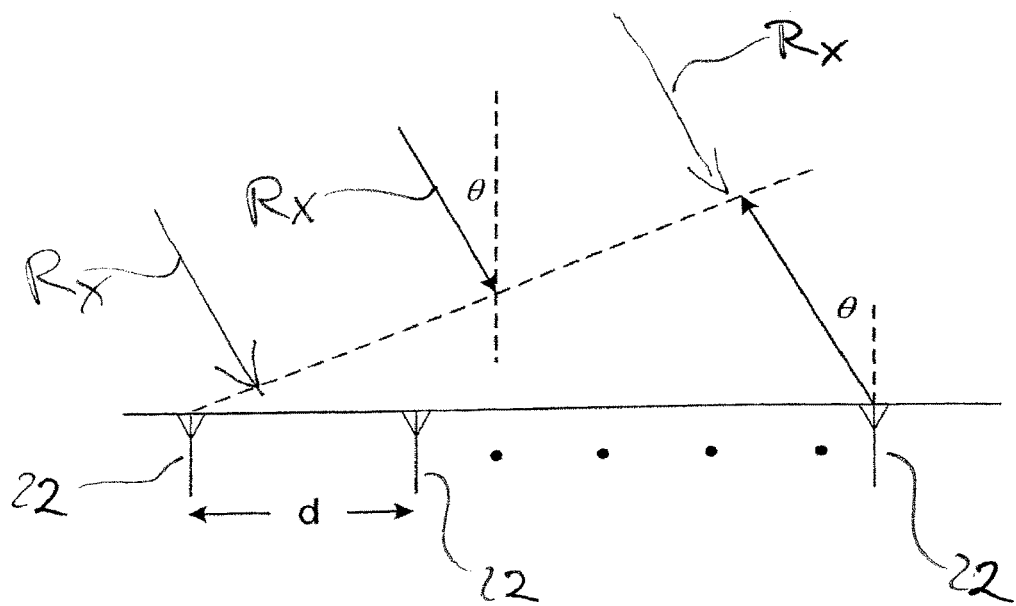

In a far field assumption as schematically shown in FIG. 4a, the receiving signals Rx as the incident signals are assumed to be a plane wave. The incidence angle θ of the received signals Rx for each of the receiving antenna elements 22 is identical to a common angle θ of arrival as show in FIG. 4a. In an array of M receiving antenna elements 22 receive the received signals Rx generated by a number of D narrowband sources in the far field, the output X(t) of the receiving antenna 22 is sampled at different time instances.

Figure 4B:
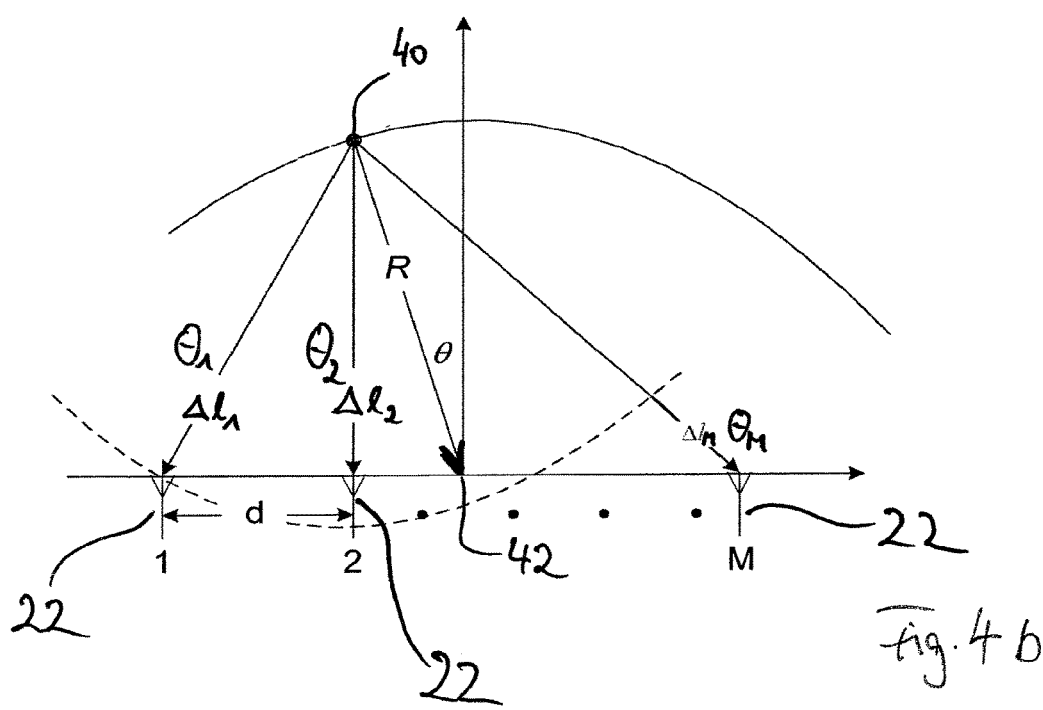

In the contrary, for the case that the object 40 is in the near field of the receive antennas 22, the received signals Rx impinge at the different receiving antenna elements 22 with different angles $\theta_1, \ldots, \theta_M$ so that the far field assumption cannot be used. Using the polar coordinates, the incident angle θ is a function of the distance R of the object 40 and the incident angle θ to the array center 42 as shown in FIG. 4b. As illustrated in FIG. 4b, the received signals Rx reflected from the object 40 at the position R, θ impinge on the array of receiving antennas 22 at different angles θ. If the center 42 of the array is used as a reference position, two way path difference from the transmitting antenna elements 21 to the object 40 to the antenna elements 22 are $\Delta 1_1$, $\Delta 1_2, \ldots, \Delta 1_M$, wherein $\Delta 1$ is a function of R, θ.

Each signal received by each of the antenna elements 22 can be written as:

$$s_i = s(t) \cdot e^{-j\omega \frac{\Delta l_i}{c}} \quad (4)$$

wherein the signal received at each of the M receive antennas 22 or array elements 22 are linear combinations of the D incident signals reflected from different objects 40 in the field of view and noise. Using a signal model for D different signals incident on the array of antenna elements 22 and corrupted by noise, the signal received by one of the antenna elements 22, i.e. antenna element m is:

$$x_m = \sum_{i=1}^{D} a_m(R_i, \theta_i) s_i + n_m \quad (5)$$

wherein $a_m$ is a near field steering vector and $n_m$ is a noise vector.

The signal received by the array of receive antennas 22 can be written in the following form:

$$\begin{bmatrix} x_1 \\ x_2 \\ \vdots \\ x_M \end{bmatrix} = \begin{bmatrix} a_1(R_1,\theta_1) & a_1(R_2,\theta_2) & \ldots & a_1(R_D,\theta_D) \\ a_2(R_1,\theta_1) & a_2(R_2,\theta_2) & & \vdots \\ \vdots & & \ddots & \vdots \\ a_M(R_1,\theta_1) & \ldots & \ldots & a_M(R_D,\theta_D) \end{bmatrix} \begin{bmatrix} s_1 \\ s_2 \\ \vdots \\ s_D \end{bmatrix} + \begin{bmatrix} n_1 \\ n_2 \\ \vdots \\ n_M \end{bmatrix} \quad (6)$$

or in a short form as:

$$X = A(R,\theta)S + N \quad (7)$$

wherein $$S = [s_1\ s_2\ \ldots\ s_D]^T$$

$$A = [a(R_1,\theta_1)a(R_2,\theta_2)\ \ldots\ a(R_D,\theta_D)]$$

$$N = [n_1\ n_2\ \ldots\ n_m]^T$$

and $a(R,\theta)$ is the near field array steering vector which can be expressed by:

$$a(R,\theta) = \left[ e^{-j\omega\frac{\Delta l_1}{c}}\ e^{-j\omega\frac{\Delta l_2}{c}}\ e^{-j\omega\frac{\Delta l_3}{c}}\ \ldots\ e^{-j\omega\frac{\Delta l_m}{c}} \right]^T \quad (8)$$

S is the vector of the D incident signals reflected from different objects 40 in the field of view, A is an M×D matrix of the near field array steering vector, and N is the noise vector of each of the receiving antenna elements 22 having zero mean and variants $\Phi_n^2$. The near field array steering vector A is merely dependent on physical parameters of the array of receiving antennas 22 and therefore known. Assuming that the different incident received signals Rx are uncorrelated and the noise vectors are uncorrelated with equal variances, the correlation matrix can be written as $$R_{xx} = E[XX^H] = AR_{SS}A^H + \sigma^2 I \quad (9)$$

wherein $R_{SS}$ is a D×D source correlation matrix and I=M×M identity matrix.

The signal correlation matrix $R_{xx}$ is an M×M matrix having the rank D. On the basis of the D eigenvectors associated with the received signals Rx and M×D eigenvectors associated with noise, which are the eigenvectors associated with the smallest eigenvalues are produced. For uncorrelated signals, the smallest eigenvalues are equal to the variants of the noise. Depending on that the M×(M−D) dimensional subspace is constructed which is spanned by the noise eigenvectors, which can be written as:

$$E = [e_1 e_2 \ldots e_{M-D}]$$

wherein the noise subspace eigenvectors are orthogonal to the array steering vectors A at the angles of arrival $\theta_1$, $\theta_2, \ldots, \theta_D$. On the basis of the MUSIC algorithm, the pseudo spectrum is given as:

$$P_{NF\text{-}MUSIC}(R,\theta) = \frac{1}{\left| A(R,\theta)^H E_N E_N^H A(R,\theta) \right|} \quad (11)$$

wherein A are the array steering vectors and $E_N$ are the determined eigenvectors.

The two-dimensional estimation problem to estimate the distance R and the angle θ of the position of the object 40 is converted into multiple one-dimensional problems to separately estimate the distance R and the angle θ. For a defined distance R, the frequency of the reflected signal from the object 40 at that distance can be determined from equation 3. The time dependent signals can be transformed by a Fourier transformation to the frequency domain. In general, the frequency bins or peaks which correspond to the same object 40 in the field of view are selected by selecting the same frequency bins from the spectrums of the different receive antenna elements 22 and the signal vectors over multiple snapshots can be used to estimate the correlation matrix X. If it is assumed that an amount of N snapshots are available for the estimation, the correlation matrix $R_{xx}$ for a defined distance R is given as:

$$R_{XX} = \frac{1}{N} \sum_{j=1}^{N} X_j(\omega) X_j(\omega)^H, \quad \omega = \frac{4\pi A_b R}{c} \quad (12)$$

Since the distance to the object 40 is defined and can be introduced via the eigenvectors $E_N$, the respective direction θ of the object 40 with respect to the radar sensor 22 can be determined from the pseudo spectrum based on the defined distance R. In this respect it is assumed that the array correlation matrix $R_{xx}$ has been formed on the basis of equation 9, wherein the noise variants $\Phi$ for all receiving antenna elements 22 is identical and the difference signals are completely uncorrelated. In the case that the source correlation matrix $R_{SS}$ is not diagonal and/or the noise variances vary, the pseudo spectrum can change and the resolution will be reduced.

The known MUSIC algorithm is based on the assumption that the signals received by each of the receive antenna elements 22 are uncorrelated so that the correspondingly determined signal correlation matrix is diagonal. Electromagnetic radiation like radar waves emitted from transmitting antennas 21 and reflected by objects in the field of view are usually highly correlated so that the performance of the MUSIC algorithm is significantly reduced.

The correlation matrix $R_{xx}$ is a full-rank matrix (i.e. non-singular) as long as the incident signals Rx received by the receiving antenna elements 22 are uncorrelated, which is important for the decomposition of the eigenvalues. If the incident received signal Rx become highly correlated, which is a realistic assumption in practical environments, especially in the near field with static objects in the field of view, the correlation matrix $R_{xx}$ loses the non-singularity property and therefore the performance of the MUSIC algorithm will be significantly reduced. To overcome this, a spatial smoothening can be applied to remove the correlation between the incident received signals as described in detail below.

Figure 5:
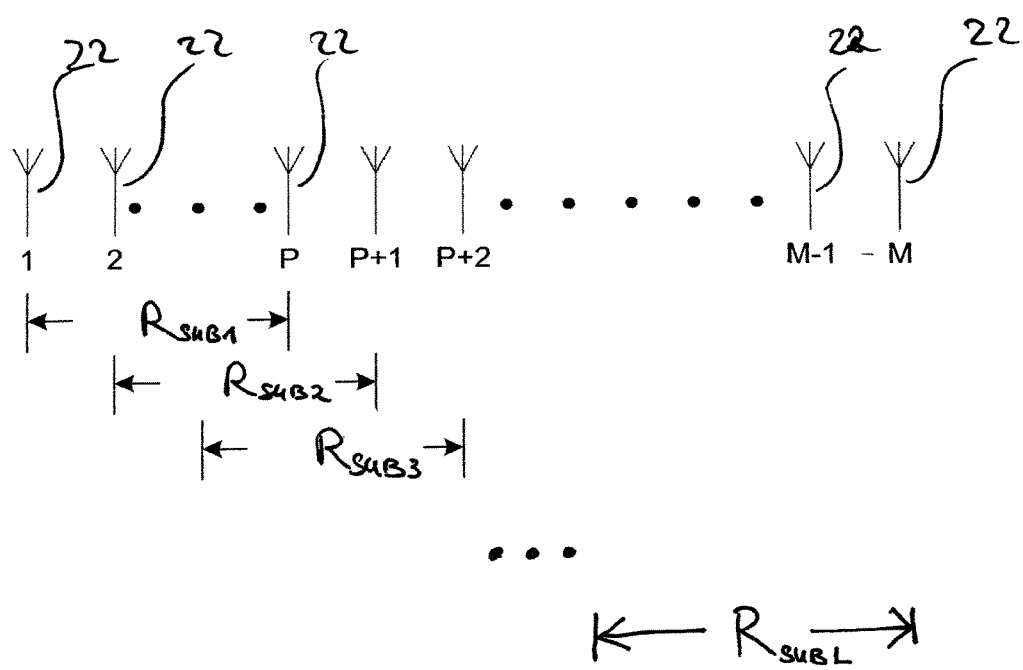
FIG. 5 shows an embodiment of the radar sensor comprising a plurality of virtual sub-arrays.

In FIG. 5, the receiving antenna elements 22 are schematically shown forming a virtual array as described above. The virtual array of the receiving antenna elements 22 are divided in different subarrays $R_{SUBi}$ in order to decorrelate the incoming received signals Rx. The array of receiving elements 22 comprises an amount of M elements, which are divided into L subarrays $R_{SUBi}$, wherein the subarrays $R_{SUBi}$ are overlapping which each other and each comprises an amount of P receive antenna elements 22 as schematically shown in FIG. 5.

As shown in FIG. 5, subarray $R_{SUB1}$ comprises the receive antenna elements 1 to P, the subarray $R_{SUB2}$, comprises a receive antenna elements 2 to P+1, etc. Hence, the amount of subarrays $R_{SUBi}$, is L=M−P+1.

On the basis of the so-defined subarrays $R_{SUBi}$, a sub-correlation matrix $R^i_{SUB}$ of each subarray $R_{SUBi}$ is estimated, wherein the dimension of each of the subarray correlation matrix is P×P. The correlation matrix $R_{xx}$ of the array of receiving antenna elements 22 is then defined as the sample mean of the correlation matrixes of the subarrays:

$$R_{xx} = \frac{1}{L} \sum_{i=1}^{L} R^i_{SUB} \quad (13)$$

wherein $R^i_{SUB}$ are the sub-correlation matrixes of the subarrays.

Hence, the correlated incident received signals Rx can be decorrelated in order to improve the performance of the algorithm to determine the direction of the position of the object 40 in the field of view.

Further, for the successful application of the MUSIC based algorithm the number of objects 40 in the field of view from which electromagnetic radiation signals are reflected are determined on the basis of the eigenvalues of the correlation matrix $R_{xx}$. The eigenvalues of the correlation matrix $R_{xx}$ correspond to the signal source and the noise. In an optimal situation, the eigenvalues corresponding to the noise are identical to the standard deviation of the noise and the eigenvalue corresponding to the received signal is significantly larger. Hence, a search for a peak of the eigenvalues or a change of the eigenvalues is performed to determine the number of reflected signals or the number of objects 40 in the field of view.

To determine the number of reflection signals or the number of objects 40 in the field of view, the eigenvalues of the correlation matrix are determined, the determined eigenvalues are sorted in an ascending order, the ratio between consecutive eigenvalues of the ascending order are determined and a threshold level is defined for the so-determined ratio so that the first peak of previously calculated ratio can be determined and the number of sources can be estimated. The eigenvalue before the detected peaks belong to the noise and the eigenvalues after the determined peak belong to the signal sources so that the number of objects 40 in the field of view can be precisely determined.

To generate range angle and intensity image power of the reflected signals reflected by the object 40 or objects 40 in the field of view has to be estimated. The MUSIC based algorithm can estimate the incident angle θ of the object 40 however the power of the incoming signal cannot be estimated. Hence, an additional method and information must be used to estimate the power of the incoming signal. The power of the incoming signal is estimated on the basis of an amplitude of a beamformed signal which is weighted by a value of the correlation matrix $R_{xx}$ at a corresponding position. The basic idea of beamforming is to compensate if propagation delay across the receive antenna array to create interference pattern, in which the majority of the signal energy is provided in one angular direction as e.g. shown in FIG. 4a. The beam width of beamforming is on the order of the radar wavelength divided by the aperture dimension. Therefore, a high degree of angular resolution is possible only when the antenna aperture is many wavelength in the extent for beamforming. In general, the beamforming is performed by filtering or delay of the received signals Rx received by the antenna elements 22 in order to receive a signal from a certain position R, θ and wherein the amplitude of the so-determined signal is weighted by a corresponding value of the same position derived from the correlation matrix $R_{xx}$. On the basis of different signals from different positions R, θ in the field of view, a map of amplitudes can be determined dependent on the respective position, wherein the power of the respective signals of the different positions is determined by multiplying the amplitude of the map and the corresponding value of the correlation matrix with each other.

In order to suppress false targets or objects 40, joint estimation from MUSIC based algorithms and beam forming is performed to filter out the false targets. Therefore, when performing the model order estimation it is better to overestimate rather than to underestimate, because the false targets can be suppressed later when the power is estimated.

Figure 6:
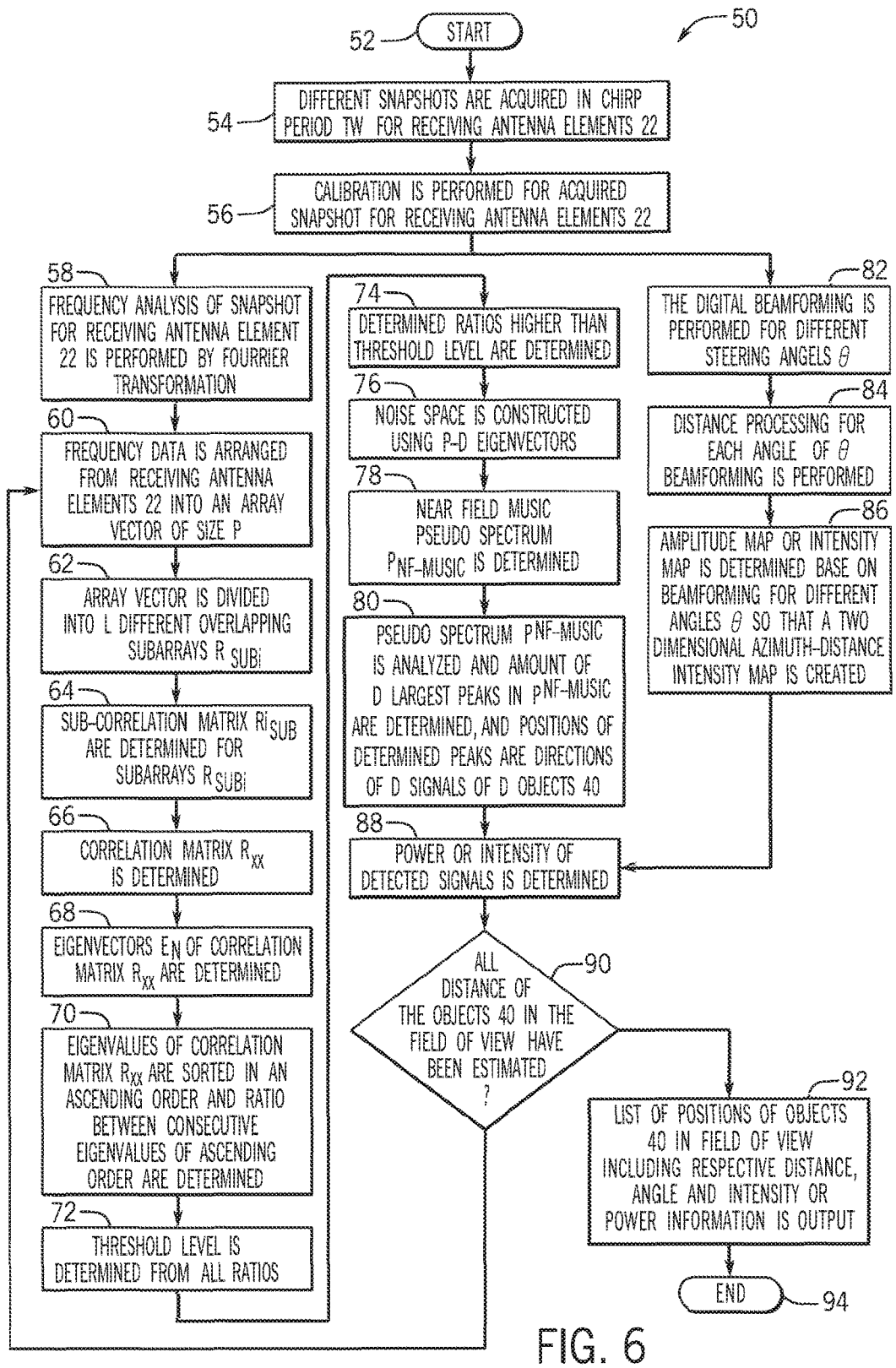
FIG. 6 shows a flow diagram of an embodiment of a surveillance method for determining an object in the field of view.

FIG. 6 shows a schematic flow chart of the method for determining a position of the object 40 in the field of view. The method shown in FIG. 6 is generally denoted by 50.

The method starts at step 52. At step 54 different snapshots are acquired in the chirp period $T_W$ for each of the receiving antenna elements 22. At step 56 a calibration is performed for each acquired snapshot for each of the receiving antenna elements 22.

A frequency analysis of each snapshot for each receiving antenna element 22 is performed by means of a Fourrier transformation as shown at step 58. For each bin or frequency peak frequency data is arranged from each of the receiving antenna elements 22 into an array vector of the size P corresponding to the respective subarrays $R_{SUBi}$ as shown at step 60. At step 62, the array vector is divided into L different overlapping subarrays $R_{SUBi}$ and at step 64, the sub-correlation matrix $R^i_{SUB}$ are determined for each of the subarrays $R_{SUBi}$ using equation 9. At step 66, the correlation matrix $R_{xx}$ is determined on the basis of the equation 13. At step 68, the eigenvectors $E_N$ as shown in equation 10 of the correlation matrix $R_{xx}$ are determined. At step 70 the eigenvalues of the correlation matrix $R_{xx}$ are sorted in an ascending order and the ratio between the consecutive eigenvalues of the ascending order are determined. At step 72 a threshold level is determined from all ratios and based on the requirements of the application, i.e. dependent on whether an overestimation or an underestimation of the amount of objects 40 in the field of view is preferred.

At step 74 the determined ratios higher than the threshold level are determined or identified so that the eigenvalues before the respectively found peak of the eigenvalues belong to the noise subspace and the remaining eigenvalues belong to the signal space. The number of objects 40 in the field of view is then determined as being equal to the number of signal eigenvalues.

In step 76 the noise space is constructed using the P-D eigenvectors corresponding to the P-D smallest eigenvalues. At step 78 the near field music pseudo spectrum $P_{NF\text{-}MUSIC}$ is determined using equation 11. At step 80 the pseudo spectrum $P_{NF\text{-}MUSIC}$ is analyzed and the amount of D largest peaks in the near field music pseudo spectrum $P_{NF\text{-}MUSIC}$ are determined and the positions of the so-determined peaks in the pseudo spectrum $P_{NF\text{-}MUSIC}$ are the directions of the D signals of D objects 40 in the field of view.

In step 82 the digital beamforming is performed for different steering angles θ and at step 84 a distance processing for each angle θ of the beamforming is performed by means of a Fourrier transformation. At step 86, an amplitude map or an intensity map is determined on the basis of the beamforming for the different angles θ so that a two dimensional azimuth-distance intensity map is created.

On the basis of the amplitudes or the intensities of the intensity map determined in step 86 and the correlation matrix $R_{xx}$, the power or the intensity of the detected signals is determined at step 88. At step 90 it is checked whether all distances of the objects 40 in the field of view have been estimated and if not, the method returns to step 16 or if all distances have been estimated, the list of positions of the objects 40 in the field of view including the respective distance, the angle and the intensity or power information is provided as an output result as shown at step 92. At step 94, the method ends.

Hence, the distance and the direction of the object 40 in the field of view including the intensity information of the received signal or the power information can be determined also for objects 40 in the near field of the radar sensor.

Obviously, numerous modifications and variations of the present disclosure are possible in light of the above teachings. It is therefore to be understood that within the scope of the appended claims, the disclosure may be practiced otherwise than as specifically described herein.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

Any reference signs in the claims should not be construed as limiting the scope.

It follows a list of further embodiments of the disclosed subject matter:

1. A surveillance apparatus for determining a position of an object in a field of view, comprising:
    a radar sensor having at least one transmitting antenna configured to transmit electromagnetic radiation and a plurality of receiving antennas configured to receive electromagnetic radiation, wherein the transmitting antenna and the receiving antennas form a virtual antenna array, and
    a processing unit connected to the radar sensor to receive signals from the receiving antennas corresponding to the received electromagnetic radiation,
   wherein the processing unit is configured to determine a correlation matrix on the basis of the received signals, and wherein the processing unit is configured to determine a direction of a position of the object in the field of view with respect to the radar sensor on the basis of the correlation matrix for a defined distance of the object from the radar sensor.
2. The surveillance apparatus according to embodiment 1, wherein the processing unit is configured to determine the direction on the basis of Eigenvectors of the correlation matrix.
3. The surveillance apparatus according to embodiment 1, wherein the processing unit is configured to determine the defined distance on the basis of a Fourier transformation of the plurality of signals.
4. The surveillance apparatus according to embodiment 2, wherein the processing unit is configured to determine a pseudo spectrum on the basis of the Eigenvectors and to determine the direction of the object on the basis of the pseudo spectrum.
5. The surveillance apparatus according to embodiment 4, wherein the processing unit is configured to determine the direction on the basis of peaks in the pseudo spectrum.
6. The surveillance apparatus according to embodiment 4, wherein the processing unit is configured to determine the pseudo spectrum on the basis of a near field array steering vector.
7. The surveillance apparatus according to embodiment 4, wherein the processing unit is configured to determine the pseudo spectrum on the basis of a MUSIC algorithm.
8. The surveillance apparatus according to embodiment 1, wherein the virtual antenna array is virtually divided in different subarrays and wherein the processing unit is configured to determine the correlation matrix on the basis of sub-correlation matrices determined on the basis of the signals of the virtual subarrays.
9. The surveillance apparatus according to embodiment 8, wherein the virtual subarrays are overlapping with each other.
10. The surveillance apparatus according to embodiment 8, wherein the correlation matrix is determined on the basis of a sum of a plurality of the sub-correlation matrices.
11. The surveillance apparatus according to embodiment 1, wherein the processing unit is configured to determine an amount of different reflection signals from the signals corresponding to different objects in the field of view on the basis of eigenvalues of the covariance matrix.
12. The surveillance apparatus according to embodiment 12, wherein the eigenvalues are compared to eigenvalues of a standard deviation to determine the amount of different reflection signals.
13. The surveillance apparatus according to embodiment 11, wherein the eigenvalues are sorted in an ascending order and wherein a ratio of consecutive eigenvalues in the ascending order is determined and wherein the processing unit is configured to determine the amount of different reflection signals on the basis of a threshold level for the ratio of the consecutive eigenvalues.
14. The surveillance apparatus according to embodiment 1, wherein the processing unit is configured to determine a power of the reflected signals received by the radar sensor on the basis of an amplitude of beamformed signal weighted by a value of the correlation matrix.
15. The surveillance apparatus according to embodiment 14, wherein a map of amplitudes is determined for different positions in the filed of view on the basis of a plurality of beamformed signals and wherein the power of the signals of the different positions is determined on the basis of the map of amplitudes and the corresponding values of the correlation matrix.
16. The surveillance apparatus according to embodiment 1, wherein the radar sensor comprises emitting antennas configured to emit electromagnetic radiation signals, which are formed as frequency modulated continuous wave signals and wherein the signals corresponding to the received electromagnetic radiation have different frequencies each dependent on a distance to the object in the field of view to the respective receiving antenna.
17. The surveillance apparatus according to embodiment 1, further comprising an optical camera configured to capture images based on received light.
18. The surveillance apparatus according to embodiment 17, wherein the optical camera comprises a camera aperture and wherein the transmitting antennas and/or the receiving antennas are arranged around the camera aperture.

19. Method for estimating a position of an object in a field of view of a radar sensor comprising the steps of:
    transmitting electromagnetic radiation from at least one transmitting antenna and receiving signals from a plurality of receiving antennas of the radar sensor corresponding to received electromagnetic radiation,
    determine a correlation matrix on the basis of the signals received from the receiving antennas,
    determining a direction of a position of the object in the field of view on the basis of the correlation matrix for a defined distance of the object from the radar sensor.

20. A non-transitory computer-readable recording medium that stores therein a computer program product, which, when executed by a processor, causes the method according to embodiment 19 to be performed.

21. A computer program comprising program code means for causing a computer to perform the steps of said method according to embodiment 19 when said computer program is carried out on a computer.

The invention claimed is:

1. A surveillance apparatus for determining a position of an object among objects in a field of view, comprising:
    a radar sensor having at least one transmitting antenna configured to transmit electromagnetic radiation and a plurality of receiving antennas configured to receive electromagnetic radiation, wherein the transmitting antenna and the receiving antennas form an antenna array, the antenna array being divided into different virtual subarrays, and
    processing circuitry configured to
        receive signals from the virtual subarrays corresponding to the received electromagnetic radiation,
    determine sub-correlation matrices for respective virtual subarrays on the basis of the received signals of the virtual subarrays,
    after determining the sub-correlation matrices, determine a correlation matrix on the basis of the determined sub-correlation matrices,
    after determining the correlation matrix, determine eigenvalues and eigenvectors of the correlation matrix,
        after determining the eigenvalues and the eigenvectors of the correlation matrix, sort the eigenvalues in an ascending order, and determine a ratio for each pair of consecutive eigenvalues sorted in the ascending order,
    after determining the ratios, determine a threshold level based on the determined ratios,
        after determining the threshold level, determine ratios higher than the determined threshold level, and determine a number of the objects in the field of view based on ratios higher than the threshold,
        after determining the number of the objects in the field of view, determine a pseudo spectrum on the basis of the determined number of the objects, and
        after determining the pseudo spectrum, determine a direction of the position of the object among the objects in the field of view with respect to the radar sensor on the basis of peaks in the determined pseudo spectrum for a defined distance of the object from the radar sensor.

2. The surveillance apparatus according to claim 1, wherein the processing circuitry is configured to determine the defined distance on the basis of a Fourier transformation of the plurality of received signals.

3. The surveillance apparatus according to claim 1, wherein the processing circuitry is configured to determine the pseudo spectrum on the basis of a near field array steering vector.

4. The surveillance apparatus according to claim 1, wherein the processing circuitry is configured to determine the pseudo spectrum on the basis of a MUSIC algorithm.

5. The surveillance apparatus according to claim 1, wherein the virtual subarrays are overlapping with each other.

6. The surveillance apparatus according to claim 1, wherein the processing circuitry is configured to determine the number of the objects in the field of view on the basis of eigenvalues of a covariance matrix.

7. The surveillance apparatus according to claim 6, wherein the eigenvalues of the covariance matrix are compared to a standard deviation of noise to determine the number of the objects.

8. The surveillance apparatus according to claim 1, wherein
    electromagnetic radiation signals transmitted by the transmitting antenna are formed as frequency modulated continuous wave signals, and
    the received signals corresponding to the received electromagnetic radiation have different frequencies each dependent on a distance to the object in the field of view to each of the receiving antennas.

9. The surveillance apparatus according to claim 1, further comprising an optical camera configured to capture images based on received light.

10. The surveillance apparatus according to claim 9, wherein
    the optical camera comprises a camera aperture, and
    the transmitting antennas and/or the receiving antennas are arranged around the camera aperture.

11. A method for estimating a position of an object among objects in a field of view of a radar sensor, the method comprising:
    transmitting electromagnetic radiation from at least one transmitting antenna and receiving signals from a plurality of receiving antennas of the radar sensor corresponding to received electromagnetic radiation, the transmitting antenna and the receiving antennas forming an antenna array, the antenna array being divided into different virtual subarrays,
    determining sub-correlation matrices for respective virtual subarrays on the basis of the received signals of the virtual subarrays,
    after determining the sub-correlation matrices, determining a correlation matrix on the basis of the determined sub-correlation matrices,
    after determining the correlation matrix, determining eigenvalues and eigenvectors of the correlation matrix,
    after determining the eigenvalues and the eigenvectors of the correlation matrix, sorting the eigenvalues in an ascending order, and determining a ratio for each pair of consecutive eigenvalues sorted in the ascending order,
    after determining the ratios, determining a threshold level based on the determined ratio,
    after determining the threshold level, determining ratios higher than the determined threshold level, and determining a number of the objects in the field of view based on ratios higher than the threshold,
        after determining the number of the objects in the field of view, determining a pseudo spectrum on the basis of the determined number of the objects, and after determining the pseudo spectrum, determining a direction of the position of the object among the objects in the field of view on the basis of peaks in the determined pseudo spectrum for a defined distance of the object from the radar sensor.

12. A non-transitory computer-readable recording medium including executable instructions, which when executed by a computer cause the computer to execute a method for estimating a position of an object among objects in a field of view of a radar sensor, the method comprising:

controlling at least one transmitting antenna and a plurality of receiving antennas so that electromagnetic radiation is transmitted from at least one transmitting antenna and signals are received from a plurality of receiving antennas of the radar sensor corresponding to received electromagnetic radiation, the transmitting antenna and the receiving antennas forming an antenna array, the antenna array being divided into different virtual subarrays, determining sub-correlation matrices for respective virtual subarrays on the basis of the received signals of the virtual subarrays, after determining the correlation matrix, determining eigenvalues and eigenvectors of the correlation matrix, after determining the eigenvalues and the eigenvectors of the correlation matrix, sorting the eigenvalues in an ascending order, and determining a ratio for each pair of consecutive eigenvalues sorted in the ascending order, after determining the ratios, determining a threshold level based on the determined ratio, after determining the threshold level, determining ratios higher than the determined threshold level, and determining a number of the objects in the field of view based on ratios higher than the threshold, after determining the number of the objects in the field of view, determining a pseudo spectrum on the basis of the determined number of the objects, and after determining the pseudo spectrum, determining a direction of the position of the object among the objects in the field of view on the basis of peaks in the determined pseudo spectrum for a defined distance of the object from the radar sensor.

* * * * *